(12) United States Patent
Maurer et al.

(10) Patent No.: US 11,584,461 B2
(45) Date of Patent: Feb. 21, 2023

(54) SYSTEM AND METHOD FOR REPORTING ON VEHICLE CHARACTERISTICS DETERMINED BY TRANSMISSION CONTROL CIRCUIT

(71) Applicant: Allison Transmission, Inc., Indianapolis, IN (US)

(72) Inventors: Brent Maurer, Carmel, IN (US); Gijsbert van Gelder, Zionsville, IN (US); John A. Byerly, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 290 days.

(21) Appl. No.: 15/829,295

(22) Filed: Dec. 1, 2017

(65) Prior Publication Data

US 2018/0194413 A1 Jul. 12, 2018

Related U.S. Application Data

(60) Provisional application No. 62/444,105, filed on Jan. 9, 2017.

(51) Int. Cl.
*B62D 61/12* (2006.01)
*F16H 59/14* (2006.01)
(Continued)

(52) U.S. Cl.
CPC ............ *B62D 61/125* (2013.01); *B60K 28/08* (2013.01); *B60W 40/076* (2013.01);
(Continued)

(58) Field of Classification Search
CPC .................. B62D 61/12; B62D 61/125; B60Y 2300/188; B60Y 2300/1884; B60Y 2300/24; F16H 59/14; F16H 2059/142
See application file for complete search history.

(56) References Cited

U.S. PATENT DOCUMENTS 4,648,291 A * 3/1987 Klatt ...................... F16H 59/14
477/119
5,193,063 A * 3/1993 Assh ................... B60G 17/0155
180/209

(Continued)

FOREIGN PATENT DOCUMENTS

| CN | 102910172 A | 2/2013 |
|---|---|---|
| CN | 104015728 A | 9/2014 |

(Continued)

OTHER PUBLICATIONS

International Search Report and Written Opinion for WO Application No. PCT/US17/064242 dated Jun. 27, 2018.
(Continued)

*Primary Examiner* — Barry Gooden, Jr.
(74) *Attorney, Agent, or Firm* — Faegre Drinker Biddle & Reath LLP

(57) ABSTRACT

Systems and methods for reporting on vehicle characteristics determined by the control system of a multi-speed automatic transmission of a vehicle are provided. The control system may output a vehicle mass alert based on a relationship between a vehicle mass threshold and a determined vehicle mass satisfying a condition. The control system may output a vehicle road grade alert based on a relationship between a vehicle road grade threshold and a determined vehicle road grade satisfying a condition.

29 Claims, 9 Drawing Sheets

(51) Int. Cl.
  *G07C 5/08* (2006.01)
  *B60W 40/13* (2012.01)
  *B60K 28/08* (2006.01)
  *B60W 40/076* (2012.01)
  *B60W 50/14* (2020.01)

(52) U.S. Cl.
  CPC ............ *B60W 40/13* (2013.01); *B60W 50/14* (2013.01); *B62D 61/12* (2013.01); *F16H 59/14* (2013.01); *G07C 5/0825* (2013.01); *G07C 5/0833* (2013.01); *B60W 2050/146* (2013.01); *B60W 2530/10* (2013.01); *B60W 2552/15* (2020.02); *B60Y 2300/24* (2013.01)

(56) References Cited

U.S. PATENT DOCUMENTS

| | | | | |
|---|---|---|---|---|
| 5,445,128 | A * | 8/1995 | Letang | B60K 31/045 123/436 |
| 5,490,063 | A * | 2/1996 | Genise | F16H 59/52 701/1 |
| 6,026,784 | A * | 2/2000 | Weisman | B60W 30/192 123/436 |
| 6,067,489 | A * | 5/2000 | Letang | F01P 7/04 123/299 |
| 7,222,867 | B2 * | 5/2007 | Rotz | B60G 17/0155 180/209 |
| 7,896,769 | B2 * | 3/2011 | Long | F16H 61/0206 475/123 |
| 7,966,115 | B2 * | 6/2011 | Bellinger | F16H 61/0213 700/900 |
| 8,000,877 | B2 * | 8/2011 | Aussillou | F02D 11/105 123/396 |
| 8,332,108 | B2 * | 12/2012 | Kresse | F16H 61/0213 477/900 |
| 8,439,804 | B2 * | 5/2013 | Hagelskamp | F16H 61/0206 477/156 |
| 8,935,068 | B2 * | 1/2015 | Kresse | F16H 61/68 701/51 |
| 9,365,201 | B2 * | 6/2016 | Shattuck | B60W 10/02 |
| 9,592,822 | B2 * | 3/2017 | West | B60W 10/115 |
| 9,726,279 | B2 * | 8/2017 | Anderson | G07C 5/0808 |
| 10,040,456 | B2 * | 8/2018 | West | B60W 10/06 |
| 10,281,030 | B2 * | 5/2019 | Maurer | F16H 61/0213 |
| 2002/0117823 | A1 * | 8/2002 | Mlsna | B60G 17/0523 280/86.5 |
| 2003/0135320 | A1 * | 7/2003 | Bellinger | B60W 10/10 701/103 |
| 2005/0090962 | A1 * | 4/2005 | Ota | F16H 3/663 701/51 |
| 2006/0170168 | A1 * | 8/2006 | Rotz | B60G 17/0155 280/5.501 |
| 2010/0191428 | A1 * | 7/2010 | Tamura | F16H 61/66259 701/58 |
| 2010/0305822 | A1 | 12/2010 | Kresse et al. | |
| 2012/0029776 | A1 * | 2/2012 | Staudinger | F16H 61/0213 701/55 |
| 2014/0000969 | A1 * | 1/2014 | Carruthers | G01G 19/12 177/136 |
| 2014/0336890 | A1 * | 11/2014 | Kresse | F16H 59/54 701/60 |
| 2015/0232096 | A1 * | 8/2015 | Ellis | B60W 50/082 701/1 |
| 2015/0291134 | A1 | 10/2015 | Kamo | |
| 2017/0106869 | A1 * | 4/2017 | Lavoie | B60W 10/06 |
| 2022/0388586 | A1 * | 12/2022 | Seeger | B62D 59/04 |

FOREIGN PATENT DOCUMENTS

| | | |
|---|---|---|
| CN | 104470750 A | 3/2015 |
| DE | 102011002957 A1 | 7/2012 |
| DE | 102012004201 A1 | 10/2012 |
| DE | 102012213334 A1 | 2/2013 |
| DE | 102013000874 A1 | 7/2014 |
| WO | 2014/111238 A1 | 7/2014 |

OTHER PUBLICATIONS

German Patent Office; German Office Action; German Application No. 112017006672.6; dated Jun. 27, 2022; 8 pages.
China National Intellectual Property Administration; Chinese Office Action and Search Report; Chinese Application No. 201780082266.7; dated Nov. 24, 2021; 14 pages.
China National Intellectual Property Administration; Chinese Office Action; Chinese Application No. 201780082266.7; dated Sep. 26, 2022; 13 pages.

* cited by examiner

SYSTEM AND METHOD FOR REPORTING ON VEHICLE CHARACTERISTICS DETERMINED BY TRANSMISSION CONTROL CIRCUIT

RELATED APPLICATION

This application claims the benefit of U.S. Provisional Application No. 62/444,105, filed Jan. 9, 2017, titled SYSTEM AND METHOD FOR REPORTING ON VEHICLE CHARACTERISTICS DETERMINED BY TRANSMISSION CONTROL CIRCUIT, the entire disclosure of which is expressly incorporated by reference herein.

FIELD OF THE DISCLOSURE

The present disclosure relates to a multi-speed automatic transmission and in particular to a multi-speed automatic transmission having a plurality of forward speed ratios and a control system for reporting on vehicle characteristics determined by the control system.

BACKGROUND OF THE DISCLOSURE

Multi-speed automatic transmissions having an operator interface for the selection of a desired forward speed ratio and vehicles incorporating such multi-speed automatic transmissions are known. Exemplary transmissions and control systems for determining one or more vehicle characteristics are disclosed in US Published Patent Application No. 2014/0336890, filed Jun. 18, 2013, titled SYSTEM AND METHOD FOR OPTIMIZING DOWNSHIFTING OF A TRANSMISSION DURING VEHICLE DECELERATION; U.S. Pat. No. 8,332,108, filed Jun. 1, 2009, titled SYSTEM FOR DETERMINING A VEHICLE MASS-BASED BREAKPOINT FOR SELECTING BETWEEN TWO DIFFERENT TRANSMISSION SHIFT SCHEDULES; U.S. Pat. No. 9,365,201, filed Mar. 15, 2013, titled DEVICE, SYSTEM, AND METHOD FOR CONTROLLING TRANSMISSION TORQUE TO PROVIDE HILL ASCENT AND/OR DESCENT ASSISTANCE USING ROAD GRADE; U.S. Pat. No. 7,499,784, filed Apr. 7, 2007, titled METHOD OF SELECTING A TRANSMISSION SHIFT SCHEDULE; and U.S. patent application Ser. No. 15/220,803, filed Jul. 27, 2016, titled MANUAL SHIFTING CONTROL SYSTEM AND METHOD FOR MULTI-SPEED AUTOMATIC TRANSMISSION, the entire disclosures of which are expressly incorporated by reference herein.

SUMMARY

The present disclosure provides systems and methods for reporting on vehicle characteristics determined by a control system of a multi-speed automatic transmission. The systems and methods may provide an indication of the determined vehicle characteristic to a vehicle characteristic threshold.

In some instances throughout this disclosure and in the claims, numeric terminology, such as first, second, third, and fourth, is used in reference to various components, speed ratios, and other items. Such use is not intended to denote an ordering of the components. Rather, numeric terminology is used to assist the reader in identifying the component being referenced and should not be narrowly interpreted as providing a specific order of components.

In an exemplary embodiment of the present disclosure, a motive system for a vehicle is provided. The motive system comprising a multi-speed automatic transmission including an input member and an output member operatively coupled to the input member, the multi-speed automatic transmission being configurable in a plurality of forward speed ratios between the input member and the output member; a transmission control circuit operatively coupled to the multi-speed automatic transmission, the transmission control circuit configures the multi-speed automatic transmission to establish each of the plurality of forward speed ratios; and a memory electrically coupled to the transmission control circuit and having stored thereon a vehicle mass threshold. The transmission control circuit determines a vehicle mass of the vehicle, determines a relationship of the determined vehicle mass and the vehicle mass threshold, and outputs a vehicle mass alert when the relationship of the determined vehicle mass and the vehicle mass threshold satisfies a condition.

In another exemplary embodiment of the present disclosure, a method for providing a vehicle mass alert condition is provided. The method comprising the steps of storing a vehicle mass threshold on a memory electrically coupled to a transmission control circuit of a multi-speed automatic transmission; determining a vehicle mass of a vehicle including the transmission control circuit of the multi-speed automatic transmission and the multi-speed automatic transmission; determining a relationship of the determined vehicle mass of the vehicle and the vehicle mass threshold; and outputting a vehicle mass alert when the relationship of the determined vehicle mass of the vehicle and the vehicle mass threshold satisfies a condition.

In a further exemplary embodiment of the present disclosure, a motive system for a vehicle is provided. The motive system comprising a multi-speed automatic transmission including an input member and an output member operatively coupled to the input member, the multi-speed automatic transmission being configurable in a plurality of forward speed ratios between the input member and the output member; a transmission control circuit operatively coupled to the multi-speed automatic transmission, the transmission control circuit configures the multi-speed automatic transmission to establish each of the plurality of forward speed ratios; and a memory electrically coupled to the transmission control circuit and having stored thereon a vehicle road grade threshold. The transmission control circuit determines a vehicle road grade of the vehicle, determines a relationship of the determined vehicle road grade of the vehicle and the vehicle road grade threshold, and outputs a vehicle road grade alert when the relationship of the determined vehicle road grade and the vehicle road grade threshold satisfies a condition.

In yet a further exemplary embodiment of the present disclosure, a method for providing a vehicle road grade alert condition is provided. The method comprising the steps of storing a vehicle road grade threshold on a memory electrically coupled to a transmission control circuit of a multi-speed automatic transmission; determining a vehicle road grade of a vehicle including the transmission control circuit of the multi-speed automatic transmission and the multi-speed automatic transmission; determining a relationship of the determined vehicle road grade and the vehicle road grade threshold; and outputting a vehicle road grade alert when the relationship of the determined vehicle road grade and the vehicle road grade threshold satisfies a condition.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
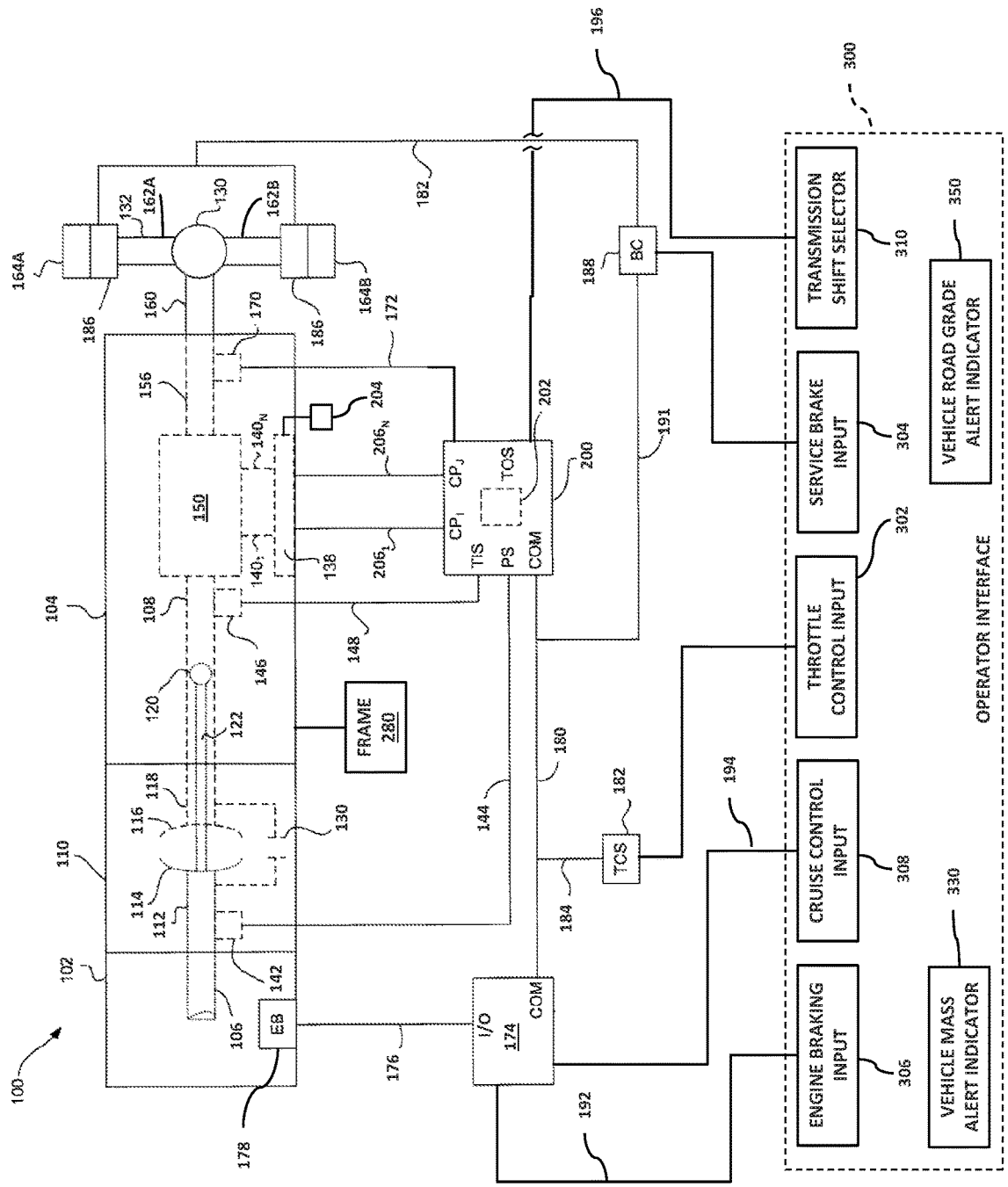
FIG. 1 illustrates a block diagram and schematic view of one illustrative embodiment of a powered vehicular system having a multi-speed automatic transmission.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

Referring now to FIG. 1, an exemplary schematic view of a vehicular system 100 is shown. The vehicular system 100 includes a prime mover 102 operatively coupled to a multi-speed automatic transmission 104 both supported by a frame 280. Exemplary prime movers include internal combustion engines, electric motors, hybrid power systems, and other suitable power systems.

Figure 2:
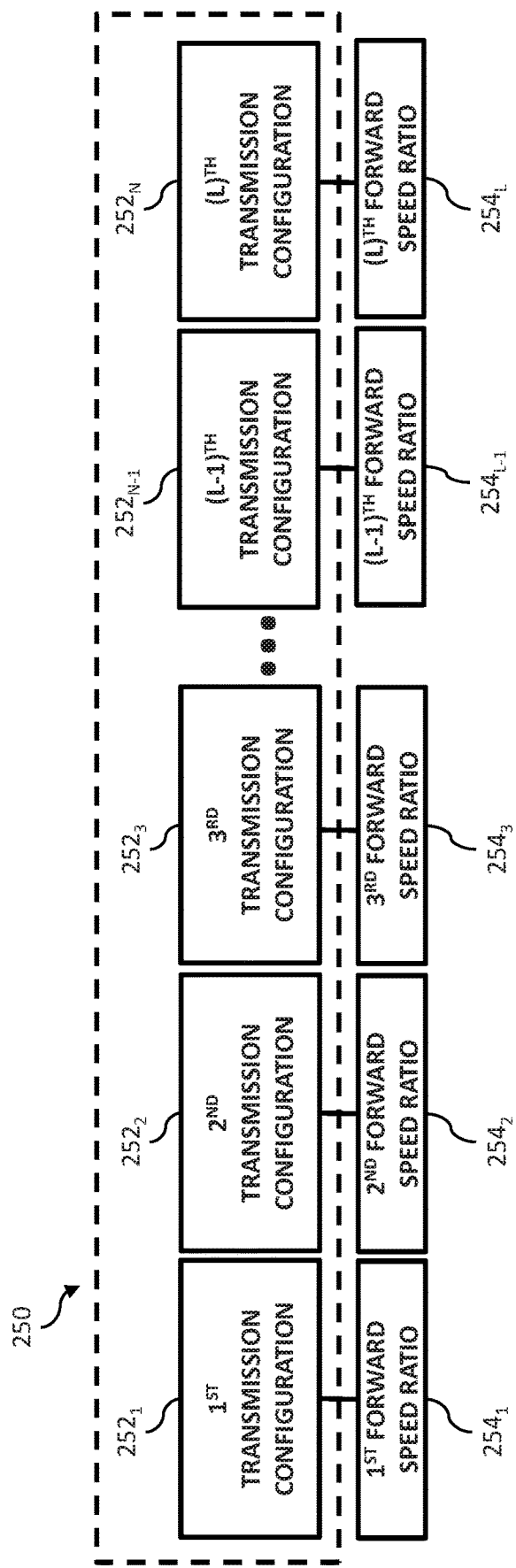
FIG. 2 illustrates a representative view of a plurality of forward speed ratios of the multi-speed automatic transmission of FIG. 1.

As used herein, the term multi-speed automatic transmission is defined as a transmission being configurable in a plurality of forward speed ratios of the output shaft to the input shaft wherein the configuration of the transmission is controlled through a transmission control circuit 200. As explained herein, transmission control circuit 200 includes a shift logic 250 which includes configuration settings $252_1$-$252_L$ (see FIG. 2), wherein L is a positive integer equal to 2 or greater, to configure the components of multi-speed automatic transmission 104 in respective forward speed ratios $254_1$-$254_L$. Multi-speed automatic transmissions may also include one or more reverse speed ratios. Exemplary multi-speed automatic transmissions include automatic transmissions and automated manual transmissions.

One exemplary automatic transmission includes a plurality of planetary gearsets having a plurality of selective couplers which are controlled by transmission control circuit 200 to configure the transmission in the various forward speed ratios. One exemplary automated manual transmission includes at least one gear carried by the input shaft, at least one gear carried by at least one countershaft, at least one gear carried by the output shaft, and a plurality of synchronizers or couplers that couple together various arrangements of the gears and/or shafts to achieve the plurality of forward speed ratios of the output shaft to the input shaft. Exemplary automated manual transmissions include both sliding mesh transmissions and constant mesh transmissions. Exemplary multi-speed automatic transmissions include both transmissions which continuously provide power from the input shaft to the output shaft during shifting and transmissions wherein power from the input shaft to the output shaft is interrupted during shifting.

Prime mover 102 includes an output shaft 106 that is operatively coupled to an input shaft 108 of multi-speed automatic transmission 104. In one embodiment, output shaft 106 of prime mover 102 is coupled to input shaft 108 of multi-speed automatic transmission 104 through a clutch (not shown). In the illustrated embodiment, prime mover 102 indirectly rotates input shaft 108 of multi-speed automatic transmission 104 through a torque converter 110. Output shaft 106 of prime mover 102 rotatably drives an input shaft 112 of torque converter 110. Input shaft 112 is fixedly coupled to an impeller or pump 114. Torque converter 110 further includes a turbine 116 that is coupled to a turbine shaft 118. A coupling fluid is provided in torque converter 110 such that a rotation of pump 114 causes through the fluid a corresponding rotation of turbine 116 and turbine shaft 118. Turbine shaft 118 is coupled to input shaft 108 of multi-speed automatic transmission 104.

In the illustrated embodiment, torque converter 110 includes a lockup clutch 130. Lockup clutch 130 is connected between pump 114 and turbine 116 of torque converter 110. Lockup clutch 130 provides a fixed coupling between pump 114 and turbine 116 when engaged and permits rotation of turbine 116 relative to pump 114 when disengaged. Generally, lockup clutch 130 is disengaged during certain operating conditions such as vehicle launch, low speed, and certain gear shifting conditions. Lockup clutch 130 is generally engaged at higher speeds or for certain gears of multi-speed automatic transmission 104. When engaged, lockup clutch 130 fixedly couples turbine shaft 118 to output shaft 106 of prime mover 102.

Multi-speed automatic transmission 104, in the illustrated embodiment, includes an internal pump 120 for building pressure within different fluid flow circuits (e.g., main circuit, lube circuit, etc.) of multi-speed automatic transmission 104. Pump 120 may be driven by a shaft 122 that is coupled to output shaft 106 of prime mover 102. Thus, prime mover 102 may rotate shaft 122 to drive internal pump 120 and build pressure within the various fluid flow circuits of multi-speed automatic transmission 104. Internal pump 120 may also regulate fluid pressure in torque converter 110.

Figure 3A:
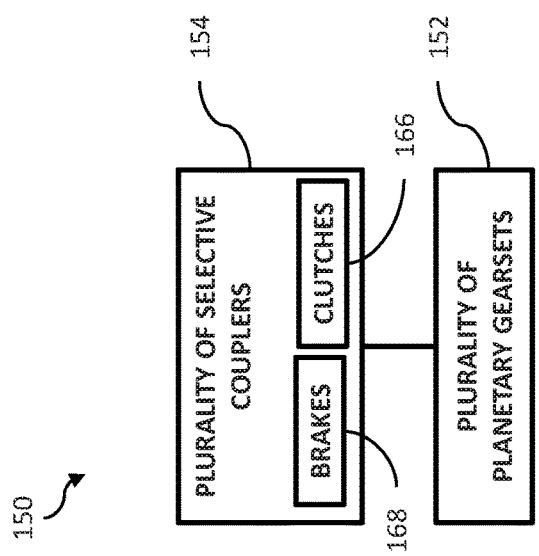
FIG. 3A illustrates a representative view of an exemplary planetary gear transmission of the powered vehicle system of FIG. 1 having a plurality of planetary gearsets and a plurality of selective couplers.

In the illustrated embodiment, multi-speed automatic transmission 104 includes a multi-speed planetary transmission 150. Referring to FIG. 3A, multi-speed planetary transmission 150 includes a plurality of planetary gearsets 152 and a plurality of selective couplers 154 which are operatively coupled to the plurality of planetary gearsets 152. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn engaged with the teeth of the ring gear. Each of these components may also be referred to as a gearset component. Each of the sun gear, the planet carrier, and the ring gear of a respective planetary gearset of the plurality of planetary gearsets 152 may be fixedly coupled to one or more of input shaft 108; an output shaft 156 of multi-speed planetary transmission 150; another one or more of the sun gear, the planet carrier, and the ring gear of one or more of the plurality of planetary gearsets; one or more of the selective couplers; a stationary member of the transmission, such as a housing; and combinations thereof.

It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier. Although multi-speed automatic transmission 104 is illustrated as multi-speed planetary transmission 150 in FIG. 3A, multi-speed automatic transmission 104 may alternatively be structured in other arrangement to provide a plurality of forward speed ratios or gears $251_1$-$254_L$.

As used herein, a selective coupler 154 is a device which may be actuated to fixedly couple two or more components together. A selective coupler 154 fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch 166. A clutch 166 couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake 168. A brake 168 couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers 154 may be actively controlled devices or passive devices. Exemplary actively controlled devices include hydraulically actuated clutch or brake elements and electrically actuated clutch or brake elements. Returning to FIG. 1, multi-speed automatic transmission 104 further includes an electrohydraulic system 138 that is fluidly coupled to multi-speed planetary transmission 150 via a number, N, of fluid paths, $140_1$-$140_N$, where N may be any positive integer. In response to control signals $206_1$-$206_N$ from transmission control circuit 200, electro-hydraulic system 138 selectively cause fluid to flow through one or more of the fluid paths, $140_1$-$140_N$, to thereby control the engagement or disengagement of selective couplers 154 of multi-speed planetary transmission 150.

In addition to coupling through selective couplers 154, various ones of the sun gears, the planet carriers, and the ring gears of the planetary gearsets 152 may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

One or more rotating components, such as shafts, drums, and other components, may be collectively referred to as an interconnector when the one or more components are fixedly coupled together. Interconnectors may further be fixedly coupled to one or more gearset components of planetary gearsets 152 and/or one or more selective couplers 154.

Multi-speed planetary transmission 150 transfers torque from input shaft 108 to output shaft 156. Further, by selectively engaging various combinations of selective couplers 154, multi-speed planetary transmission 150 is able to vary a speed ratio of output shaft 156 relative to input shaft 108 for a plurality of forward gears or speed ratios (input shaft 108 and output shaft 156 both rotating in the same direction) and at least one reverse gear or speed ratio (input shaft 108 and output shaft 156 rotating in opposite directions). The changing or shifting between the various gears of multi-speed planetary transmission 150 is accomplished by selectively controlling the respective engagement and disengagement of selective couplers 154 via control of fluid pressure within the number of fluid paths $140_1$-$140_N$.

Output shaft 156 of multi-speed automatic transmission 104 is coupled to or integral with a drive shaft 160. Output shaft 156 drives a rotation of drive shaft 160. Drive shaft 160 is coupled to a rear drive unit 162, such as a differential, Rear drive unit 162 is coupled to, and rotatably drives, axles 162A and 162B which in turn drive wheels 164A and 164B. vehicular system 100 may further include one or more tandem axles and/or one or more lift axles to assist in distributing the weight of vehicular system 100.

Returning to FIG. 1, vehicular system 100 further includes a transmission control circuit 200. In the illustrated embodiment, transmission control circuit 200 is microprocessor-based and includes a non-transitory computer readable medium 202 which includes processing instructions stored therein that are executable by the microprocessor of transmission control circuit 200 to control operation of torque converter 110 and of multi-speed automatic transmission 104. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Figure 3B:
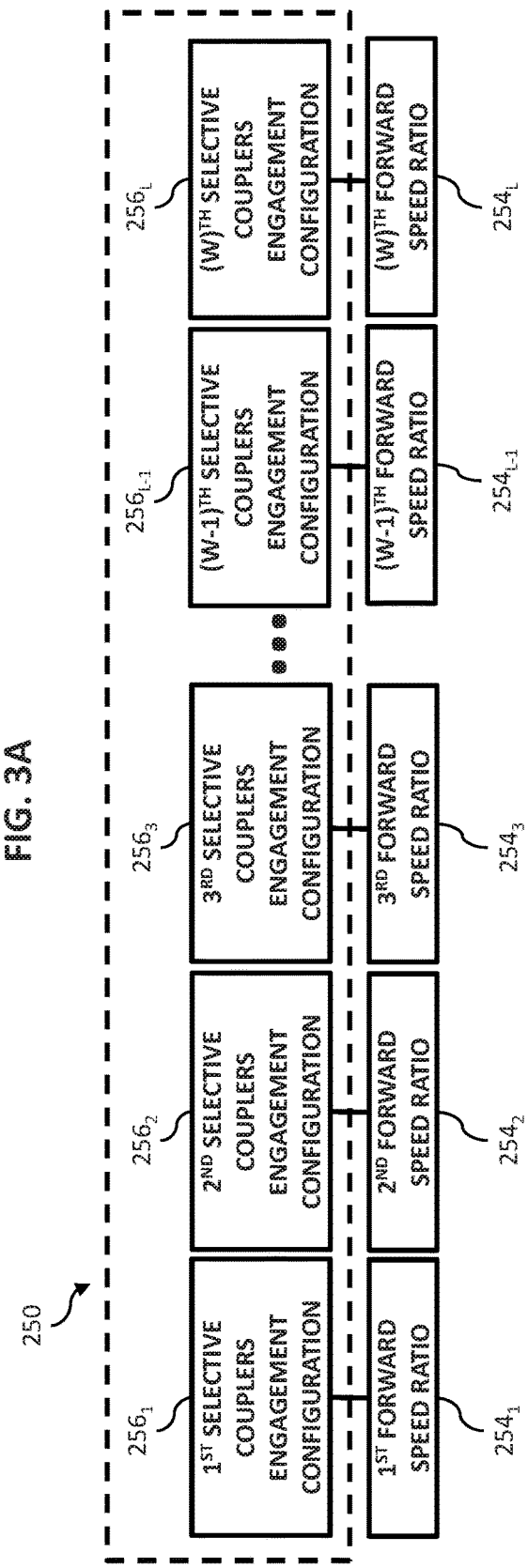
FIG. 3B illustrates a representative view of a plurality of forward speed ratios of the planetary gear transmission of FIG. 3A and the corresponding selective coupler configurations provided in a shift logic of a transmission control circuit of the powered vehicular system of FIG. 1.

For example, transmission control circuit 200 may execute a shift criteria logic 250 (see FIG. 2) which provides control signals to electro-hydraulic system 138 over control lines $206_1$-$206_N$ to achieve various configurations of multi-speed automatic transmission 104 which results in respective forward speed or gear ratios. In the case of multi-speed planetary transmission 150, shift logic 250 may selectively engage and disengage various ones of selective couplers 154, as represented as selective couplers engagement configurations $256_1$-$256_L$ in FIG. 3B, resulting in multi-speed planetary transmission 150 shifting between various gear or speed ratios $254_1$-$254_L$ of planetary gearsets 152. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which transmission control circuit 200 is not microprocessor-based, but rather is configured to control operation of the torque converter 110 and/or multi-speed automatic transmission 104 based on one or more sets of hardwired instructions and/or software instructions stored in a memory unit. Further, transmission control circuit 200 may be contained within a single device or be a plurality of devices networked together to provide the functionality described herein.

Transmission control circuit 200 receives multiple inputs that may be used by shift criteria logic 250 to determine whether to shift between various gears of multi-speed automatic transmission 104, such as various gears of planetary gearsets 152 of multi-speed planetary transmission 150 in the illustrated embodiment. Shift criteria logic 250 of transmission control circuit 200 selects which one of forward gears $254_1$-$254_L$ (via configurations $256_1$-$256_L$ for multi-speed planetary transmission 150) to be established and when to switch between forward gears $254_1$-$254_L$ (via configurations $256_1$-$256_L$ for multi-speed planetary transmission 150) based on various inputs and desired operation of vehicular system 100. For example, shift criteria logic 250 may include control logic that determines to shift between the various forward gears $254_1$-$254_L$ (via configurations $256_1$-$256_L$ for multi-speed planetary transmission 150) based on desired performance characteristics for vehicular system 100. Exemplary performance characteristics include increasing fuel economy, decreasing wear on brake components, and other performance characteristics. Exemplary control logics are disclosed in U.S. Pat. No. 8,332,108, filed Jun. 1, 2009, titled SYSTEM FOR DETERMINING A VEHICLE MASS-BASED BREAKPOINT FOR SELECTING BETWEEN TWO DIFFERENT TRANSMISSION SHIFT SCHEDULES; U.S. Pat. No. 8,935,068, filed Jun. 18, 2013, titled SYSTEM AND METHOD FOR OPTIMIZING DOWNSHIFTING OF A TRANSMISSION DURING VEHICLE DECELERATION; U.S. Pat. No. 9,365,201, filed Mar. 15, 2013, titled DEVICE, SYSTEM, AND METHOD FOR CONTROLLING TRANSMISSION TORQUE TO PROVIDE HILL ASCENT AND/OR DESCENT ASSISTANCE USING ROAD GRADE; US Published Patent Application No. 2015/0292615, filed Apr. 11, 2014, titled SYSTEM AND METHOD FOR AUTOMATIC NEUTRAL AND AUTOMATIC RETURN-TO-RANGE FOR USE WITH AN AUTOMATIC TRANSMISSION; US Published Patent Application No. 2016/0025213, filed Oct. 6, 2015, titled METHOD OF SETTING TRANSMISSION SHIFT POINTS IN REAL-TIME BASED UPON AN ENGINE PERFORMANCE CURVE, the entire disclosures of which are expressly incorporated by reference herein.

Referring to FIG. 1, vehicular system 100 includes a number of sensors associated with one of multi-speed automatic transmission 104 and torque converter 110 and configured to produce indications of one or more operating states of multi-speed automatic transmission 104 and torque converter 110, respectively. The sensors may either actively provide an indication by sending a sensor signal or passively provide an indication by making available a monitored characteristic, such as a voltage, a temperature, a pressure or other suitable characteristics. Sensors are one type of operational characteristic monitoring devices.

For example, torque converter 110 illustratively includes a conventional speed sensor 142 that is positioned to provide an indication of a rotational speed of input shaft 112 which also corresponds to the rotational speed of output shaft 106 of prime mover 102. Speed sensor 142 is electrically connected to a pump speed input, PS, of transmission control circuit 200 via a signal path 144. Transmission control circuit 200 processes the indication of the rotational speed of input shaft 112 in a conventional manner to determine the rotational speed of input shaft 112 of torque converter 110 and hence of output shaft 106 of prime mover 102.

In a similar fashion, multi-speed automatic transmission 104 includes a first conventional speed sensor 146 that is positioned to provide an indication of a rotational speed of input shaft 108 which is the same as a rotational speed of turbine shaft 118 of torque converter 110 and a second conventional speed sensor 170 that is positioned to provide an indication of a rotational speed of output shaft 156. Speed sensor 146 is electrically connected to a transmission input shaft speed input, TIS, of transmission control circuit 200 via a signal path 148. Transmission control circuit 200 processes the indication of the rotational speed of input shaft 108 in a conventional manner to determine the rotational speed of input shaft 108 or turbine shaft 118. Speed sensor 170 is electrically connected to a transmission output shaft speed input, TOS, of transmission control circuit 200 via a signal path 172. Transmission control circuit 200 processes the indication of the rotational speed of output shaft 156 in a conventional manner to determine the rotational speed of output shaft 156.

In the illustrated embodiment, vehicular system 100 further includes a prime mover control circuit 174 having an input/output port (I/O) that is electrically coupled to prime mover 102 via a number of signal paths 176, illustratively one. Prime mover control circuit 174 may be conventional, and is operable to control and manage the overall operation of prime mover 102. Prime mover 102 may include a speed retarding device which reduces the speed of prime mover 102. Exemplary speed retarding devices include an engine brake (EB) 178, an exhaust brake, or other suitable speed-retarding devices. Prime mover control circuit 174 may be electrically and operably coupled to the speed-retarding device (EB) 178 via signal paths 176 to control the speed of prime mover 102.

Prime mover control circuit 174 also includes a communication port, COM, which is electrically connected to a similar communication port, COM, of transmission control circuit 200 via one or more signal paths 180. The one or more signal paths 180 are typically referred to collectively as a data link. The communication port is one example of a communication input device. Transmission control circuit 200 and prime mover control circuit 174 are operable to exchange information via the one or more signal paths 180 in a conventional manner. In one embodiment, for example, transmission control circuit 200 and prime mover control circuit 174 are operable to exchange information via the one or more signal paths 180 in the form of one or more messages in accordance with a society of automotive engineers (SAE) J-1939 communications protocol, although this disclosure contemplates other embodiments in which transmission control circuit 200 and prime mover control circuit 174 are operable to exchange information via the one or more signal paths 180 in accordance with one or more other conventional communication protocols.

In FIG. 1, vehicular system 100 also includes a throttle control sensor (TCS) 182 which is in electrical communication with a throttle control input 302 which is part of an operator interface 300 positioned in an operator space of the vehicle. As explained in more detail herein, operator interface 300 includes a plurality of operator inputs that may be actuated or otherwise activated by an operator of the vehicle. The operator inputs are an exemplary type of operational characteristic monitoring devices.

Each of the operator inputs of operator interface 300 provide an operator interface input characteristic to one or both of transmission control circuit 200 and prime mover control circuit 174. Throttle control input 302 may be an accelerator pedal actuatable by a foot of the operator and throttle control sensor 182 monitors a position of the accelerator pedal. Throttle control input 302 may be other types of actuatable devices including finger triggers, throttle levers, and other suitable devices that may be actuated. As throttle control input 302 is actuated or triggered, the position of throttle control input 302 may be communicated to or measured by throttle control sensor 182. In turn, throttle control sensor 182 may send a corresponding signal along a signal path 184 through signal paths 180 to one or both of prime mover control circuit 174 and transmission control circuit 200. In one example, transmission control circuit 200 monitors whether throttle control input 302 is actuated or not. In another embodiment, transmission control circuit 200 monitors a percentage amount that throttle control input 302 has been actuated.

Operator interface 300 may include further operator inputs. For example, operator interface 300 includes a service brake input 304. Vehicular system 100 includes a service brake 186 that is operably coupled to axles 162A and 162B to control the speed of wheels 164A, 164B, respectively. Exemplary service brake input 304 includes a brake pedal, a brake lever, or other mechanism accessible by the operator to control the operation of the service brake 186. An operator may actuate or otherwise engage service brake 186 by actuating service brake input 304. In the illustrated embodiment, service brake 186 is controlled by a brake controller (BC) 188 which receives an input from service brake input 304 and controls the operation of service brake 186 through control line 190. In one example, control line 190 is a hydraulic line and brake controller 188 provides sufficient hydraulic pressure to actuate service brake 186 to slow wheels 164A and 164B. Further, brake controller 188 is illustratively shown as being in communication with one or both of transmission control circuit 200 and prime mover control circuit 174 through signal paths 191 and 180. In one example, transmission control circuit 200 monitors whether service brake input 304 is actuated or not.

Operator interface 300 further includes an engine speed retarding input, illustratively an engine braking input 306. Engine braking input 306 is operatively coupled to prime mover control circuit 174 over signal lines 192. Exemplary engine braking inputs include switches, buttons, dials, and other suitable input members. Prime mover control circuit 174 monitors the state of engine braking input 306 (actuated or not) or otherwise receives an indication of the state of engine braking input 306 and sets a configuration of engine brake or other suitable engine retarder 178 accordingly.

Operator interface 300 further includes a cruise control input 308. Cruise control input 308 is operatively coupled to prime mover control circuit 174 over signal lines 194. Exemplary cruise control inputs include switches, buttons, dials, and other suitable input members. Prime mover control circuit 174 monitors the state of cruise control input 308 (actuated or not) or otherwise receives an indication of the state of cruise control input 308 and sets a configuration of prime mover 102 accordingly. In one embodiment, prime mover control circuit 174 configures prime mover 102 to operate to maintain a generally constant ground speed.

Operator interface 300 further includes a transmission shift selector 310. Transmission shift selector 310 is operatively coupled to transmission control circuit 200 over one or more signal lines 196. Transmission shift selector 310 provides the operator with a plurality of inputs through which the operator may communicate a desired gear setting to transmission control circuit 200. For example, an operator may request the multi-speed automatic transmission 104 be placed in a forward gear, a reverse gear, or a neutral configuration. Further, transmission shift selector 310 may provide the operator with inputs to select a desired forward gear or speed ratio. Transmission control circuit 200 monitors the state of transmission shift selector 310 or otherwise receives an indication of the state of transmission shift selector 310 and sets a configuration of multi-speed automatic transmission 104 accordingly. Exemplary transmission shift selectors are disclosed in U.S. patent application Ser. No. 15/220,803, filed Jul. 27, 2016, titled MANUAL SHIFTING CONTROL SYSTEM AND METHOD FOR MULTI-SPEED AUTOMATIC TRANSMISSION, the entire disclosure of which is expressly incorporated by reference herein.

In one embodiment, operator interface 300 further includes a vehicle mass alert indicator 330 (see FIG. 1) that provides feedback to the operator of vehicular system 100 in response to a vehicle mass alert 332 (see FIG. 4) from transmission control circuit 200. As explained in more detail herein, transmission control circuit 200 issues vehicle mass alert 332 in response to a vehicle mass alert logic 334 (see FIG. 4) determining that a relationship of a determined mass of the vehicle and a vehicle mass threshold 336 satisfies a condition specified in vehicle mass alert logic 334. Vehicle mass alert indicator 330 may provide visual feedback, audio feedback, tactile feedback, or combinations thereof. Exemplary visual indicators 330 include an LED display, an LCD display, a plurality of indicator lights, or other suitable visual indicators.

In one embodiment, operator interface 300 further includes a vehicle road grade alert indicator 350 (see FIG. 1)

that provides feedback to the operator of vehicular system 100 in response to a vehicle road grade alert 352 (see FIG. 4) from transmission control circuit 200. As explained in more detail herein, transmission control circuit 200 issues vehicle road grade alert 352 in response to a vehicle road grade alert logic 354 (see FIG. 4) determining that a relationship of a determined road grade of the vehicle and a vehicle road grade threshold 356 satisfies a condition specified in vehicle road grade alert logic 354. Vehicle road grade alert indicator 350 may provide visual feedback, audio feedback, tactile feedback, or combinations thereof. Exemplary visual indicators 330 include an LED display, an LCD display, a plurality of indicator lights, or other suitable visual indicators.

Figure 4:
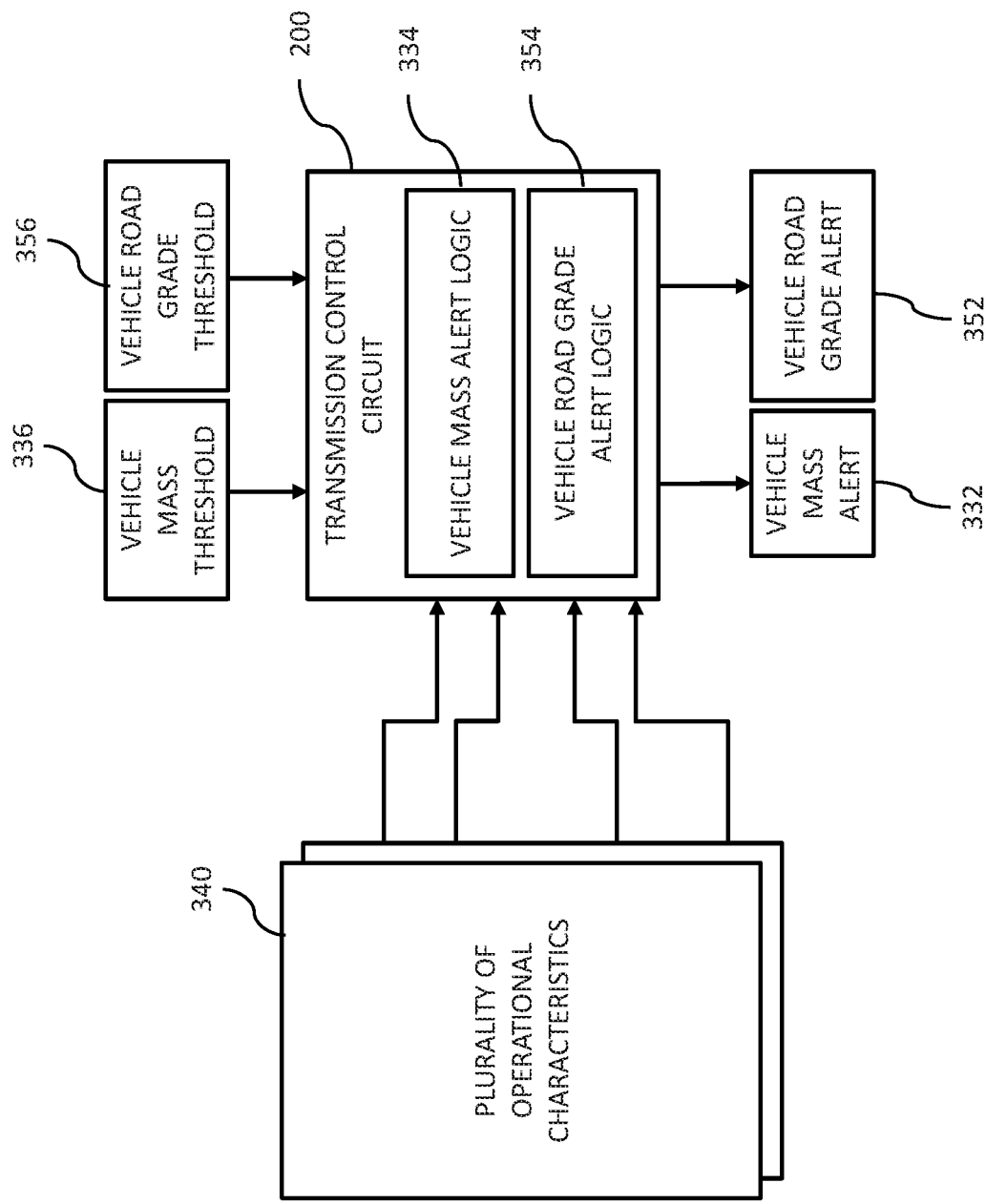
FIG. 4 illustrates a representative view of an operation of the transmission control circuit of the powered vehicular system of FIG. 1 wherein one or both of a vehicle mass alert and a vehicle road grade alert is issued.

Referring to FIG. 4, transmission control circuit 200 includes vehicle mass alert logic 334. In one embodiment, vehicle mass alert logic 334 determines a mass of the vehicle 100 based on one or more of a plurality of operational characteristics 340. The plurality of operational characteristics 340 are monitored by a plurality of operational characteristic monitors. By monitoring, an operational characteristic monitor may sense a value indicative of a parameter or determine a parameter based on one or more sensed values and/or determined values. Exemplary operational characteristic monitors include the sensors and input device disclosed herein and in U.S. patent application Ser. No. 15/220,803, filed Jul. 27, 2016, titled MANUAL SHIFTING CONTROL SYSTEM AND METHOD FOR MULTI-SPEED AUTOMATIC TRANSMISSION, the entire disclosure of which is expressly incorporated by reference herein. Vehicle mass alert logic 334 causes transmission control circuit 200 to issue vehicle mass alert 332 in response to a relationship of a determined mass of the vehicle and a vehicle mass threshold 336 satisfying a condition specified in vehicle mass alert logic 334. In one example, the condition corresponds to the determined mass of the vehicle exceeding the vehicle mass threshold 336. In another example, the condition corresponds to the determined mass of the vehicle being within a first measure of the vehicle mass threshold. Exemplary first measures of the vehicle mass threshold include a percentage of the vehicle mass threshold, an offset from the vehicle mass threshold, and other exemplary measures.

Vehicle mass alert logic 334, in one embodiment, determines the mass of the vehicle based on one or more of operational characteristics 340 at spaced apart instances of time and issues vehicle mass alert 332 when a first one of the spaced apart determined mass values exceed vehicle mass threshold 336. Vehicle mass alert logic 334, in one embodiment, determines the mass of the vehicle based on one or more of operational characteristics 340 at spaced apart instances of time and issues vehicle mass alert 332 when at least two of the spaced apart determined mass values both exceed vehicle mass threshold 336. Vehicle mass alert logic 334, in one embodiment, determines the mass of the vehicle based on one or more of operational characteristics 340 at spaced apart instances of time and issues vehicle mass alert 332 when a measure of the spaced apart determined mass values exceed vehicle mass threshold 336 over a sampling window. For example, the measure may be a percentage of spaced apart determined mass values within a sampling window (i.e. 5 samples in a 7 sample window). Vehicle mass alert logic 334, in one embodiment, issues vehicle mass alert 332 in response to a first condition and terminates vehicle mass alert 332 in response to a second condition. In one example, the first condition is exceeding vehicle mass threshold 336 and the second condition is dropping below a threshold value lower than vehicle mass threshold 336.

Vehicle mass alert logic 334 may determine the mass of the vehicle based on operational characteristics 340 in any conventional manner. Exemplary systems and methods for determining the mass of the vehicle by an exemplary transmission control circuit 200 are disclosed in U.S. Pat. No. 7,499,784, filed Apr. 9, 2007, titled METHOD OF SELECTING A TRANSMISSION SHIFT SCHEDULE and U.S. Pat. No. 8,332,108, filed Jun. 1, 2009, titled SYSTEM FOR DETERMINING A VEHICLE MASS-BASED BREAKPOINT FOR SELECTING BETWEEN TWO DIFFERENT TRANSMISSION SHIFT SCHEDULES, the entire disclosures of which are expressly incorporated by reference herein. In one example, the mass of the vehicle is determined based on the operational characteristics 340 while vehicular system 100 is in motion.

Figure 5:
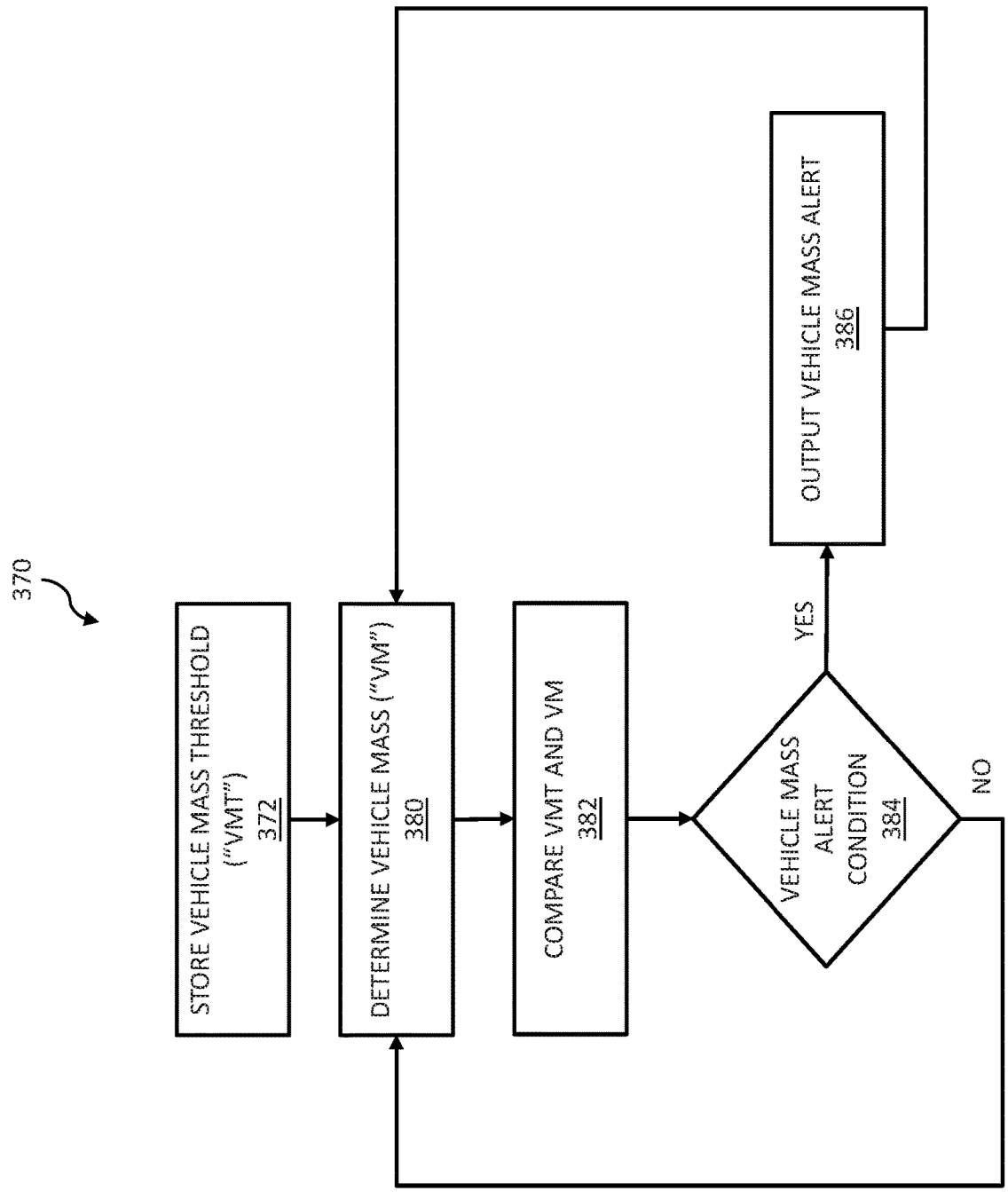
FIG. 5 illustrates an exemplary processing sequence of a vehicle mass alert logic of the transmission control circuit of FIG. 4.

Referring to FIG. 5, an exemplary processing sequence 370 of vehicle mass alert logic 334 is shown. A value for vehicle mass threshold 336 is stored in non-transitory computer readable medium 202, as represented by block 372. In one embodiment, the value for vehicle mass threshold 336 is provided through operator interface 300. In one embodiment, the value for vehicle mass threshold 336 is received through a communication input device 374 of transmission control circuit 200 from a Vehicle Electronic Programming Station ("VEPS") 376.

Figure 6:
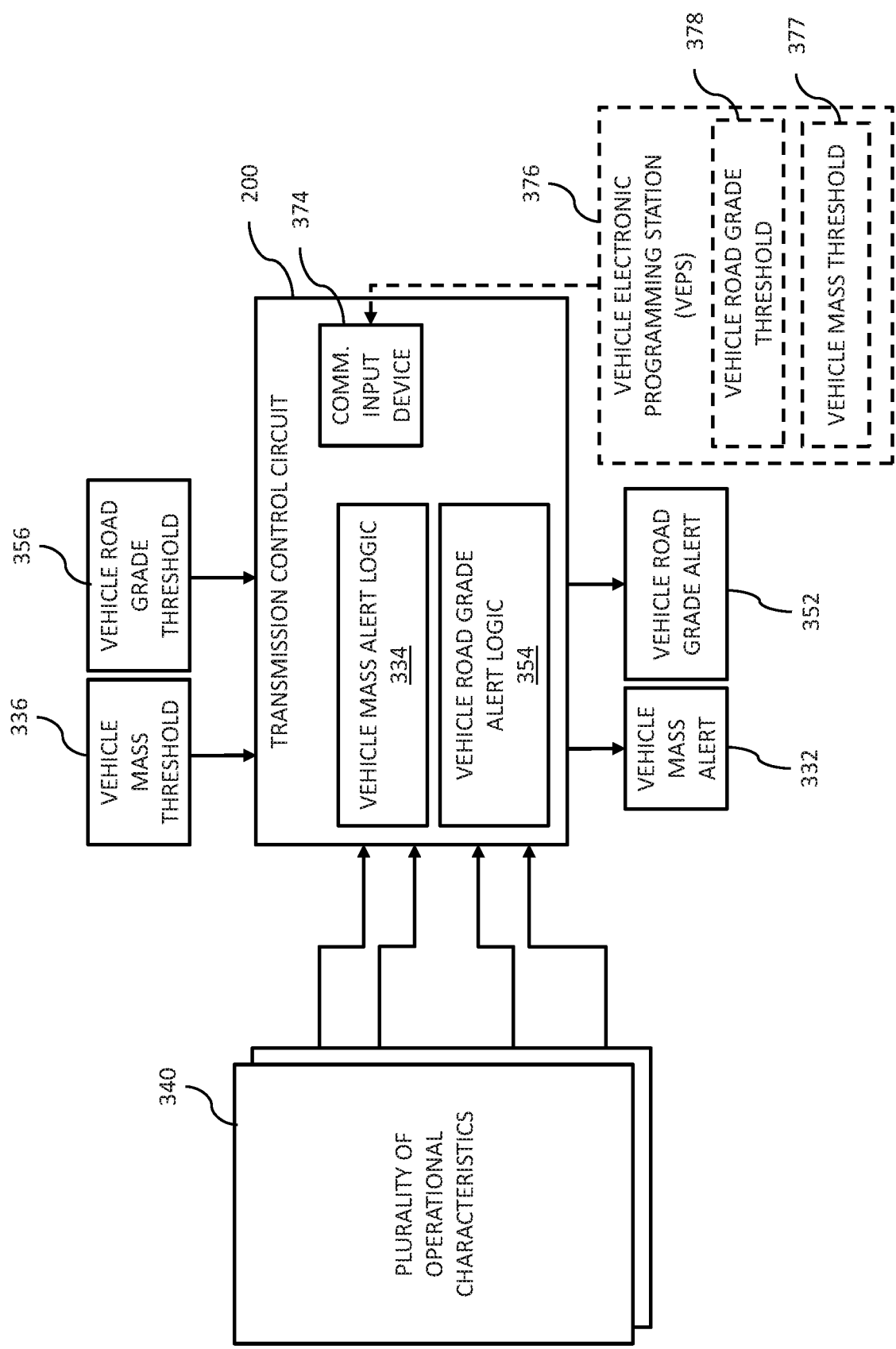
FIG. 6 illustrates a representative view of an interface between the transmission control circuit of FIG. 4 and a vehicle electronic programming station.

Referring to FIG. 6, VEPS 376 is shown in communication with transmission control circuit 200. Transmission control circuit 200 may receive one or more of a vehicle mass threshold 377, a road grade threshold 378, and other parameters for transmission control circuit 200 from VEPS 376 for storage in non-transitory computer readable medium 202. VEPS 376 may provide additional information to transmission control circuit 200 as well, such as shift schedules and other parameters. Additional details regarding VEPS 376 are provided in U.S. Pat. No. 8,935,068, filed Jun. 18, 2013, titled SYSTEM AND METHOD FOR OPTIMIZING DOWNSHIFTING OF A TRANSMISSION DURING VEHICLE DECELERATION, the entire disclosure of which is expressly incorporated by reference herein. In one embodiment, one or more of a vehicle mass threshold 377, a road grade threshold 378, and other parameters for transmission control circuit are communicated to transmission control circuit 200 via service tool re-programming, a telematics systems, or a driver programming interface.

Returning to FIG. 5, vehicle mass alert logic 334 determines the vehicle mass, as represented by block 380. Vehicle mass alert logic 334 compares the determined vehicle mass to vehicle mass threshold 336, as represented by block 382. Various exemplary comparison strategies are disclosed herein. Vehicle mass alert logic 334 determines if a vehicle mass alert condition exists based on the comparison, as represented by block 384. If a vehicle mass alert condition does not exist, vehicle mass alert logic 334 determines an updated value of the vehicle mass, as represented by the return to block 380. If a vehicle mass alert condition does exist, vehicle mass alert logic 334 outputs a vehicle mass alert, as represented by block 386 and subsequently determines an updated value of the vehicle mass, as represented by the return to block 380.

In one embodiment, vehicle mass alert logic 334 determines the mass of the vehicle and the operator of the vehicle also weighs the vehicle with a traditional scale. The scale weight of the vehicle, in one example, is used to determine a new value to be stored as vehicle mass threshold 336. The scale weight of the vehicle, in another example, is input to transmission control circuit 200 and is used to develop a correction factor for the determined mass of the vehicle.

In one embodiment, vehicle mass alert logic 334, in addition to vehicle mass alert 332, provides additional information to operator interface 300 and other vehicle systems. Exemplary additional information includes an indication that the determined vehicle mass is below vehicle mass threshold 336, that the calculation of the vehicle mass is in process or not yet determined, and whether the vehicle mass alert functionality is disabled.

As mentioned herein, vehicle mass alert 332 may be communicated to operator interface 300 to notify the operator of operator interface 300. The operator may then take additional action to reduce or redistribute the weight of vehicular system 100. In one example, the operator may drive vehicular system 100 to a facility to unload at least a portion of the cargo being carried by vehicular system 100. For instance, a refuse truck may travel to an operations center to dump its cargo or a transport truck may return to a facility that loaded the truck to have a portion of the loaded cargo removed.

Figure 7:
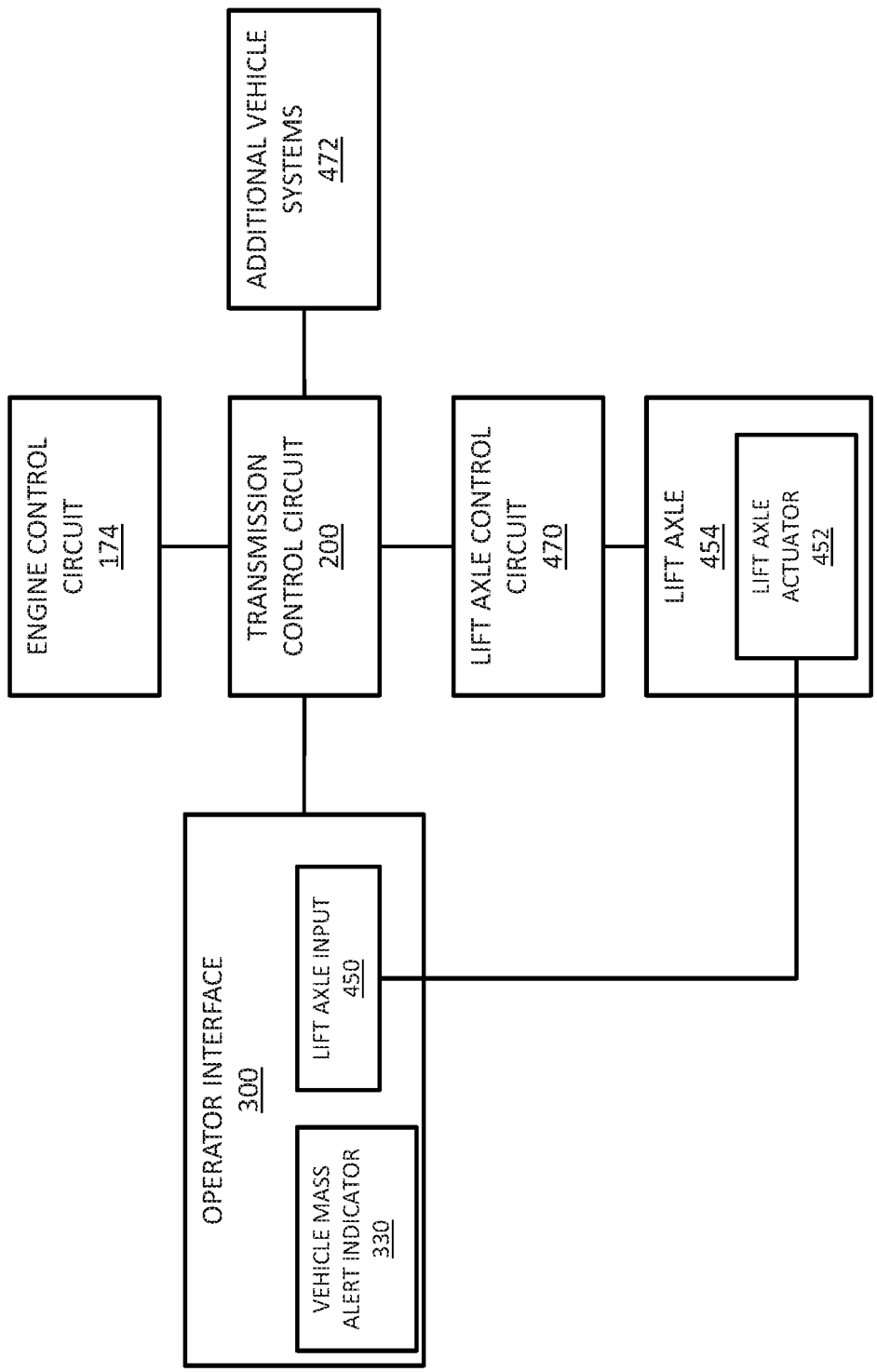
FIG. 7 illustrates a representative view of the transmission control circuit of FIG. 4 and additional components of the vehicle.

The operator may further reconfigure vehicular system 100 based on the received vehicle mass alert 332. In one embodiment, vehicle mass threshold 336 or a separate vehicle mass threshold corresponds to a vehicle mass at which it is recommended to lower one or more lift axles to redistribute the weight of the vehicle. Referring to FIG. 7, transmission control circuit 200 communicates vehicle mass alert 332 to operator interface 300 and operator interface 300 provides an indication of vehicle mass alert 332 to the operator through vehicle mass alert indicator 330. The operator, in response, causes a lift axle actuator 452 of a lift axle 454 to reposition lift axle 454 through a lift axle input 450 of operator interface 300. Exemplary lift axle input 450 include levers, buttons, dials, touch regions of a touch screen, soft keys, and any other suitable input device.

Figure 8:
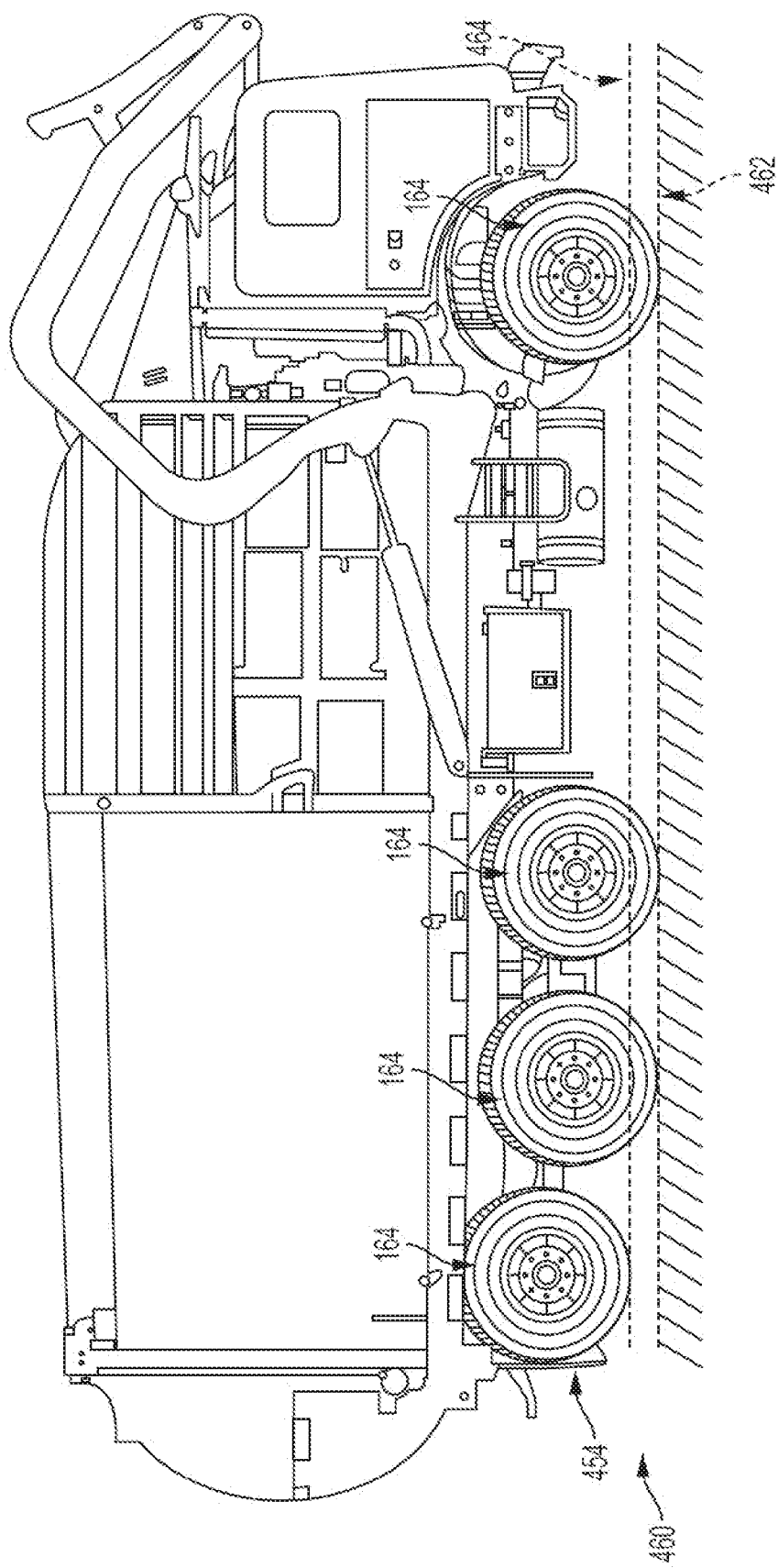
FIG. 8 illustrates an exemplary vehicle having a lift axle.

An exemplary vehicle 100 having an exemplary lift axle 454 is shown in FIG. 8. As shown in FIG. 8, each of wheels 164 that are not part of lift axle 454 are in contact with the road surface 460, as indicated by dashed line 462. In contrast, wheels 164 of lift axle 454 are spaced apart from the road surface 460, as indicated by dashed line 464. Lift axle actuator 452 of lift axle 454 operates to lower wheels 164 of lift axle 454 into contact with road surface 460 in response to a first input through lift axle input 450 and to raise wheels 164 of lift axle 454 to the illustrated spaced apart configuration illustrated in FIG. 8 in response to a second input through lift axle input 450. By lowering wheels 164 of lift axle 454 to the position of dashed line 462, lift axle 454 supports a portion of the mass of vehicular system 100 and thus the mass of vehicular system 100 is redistributed.

In one embodiment, transmission control circuit 200 is operatively coupled to a lift axle control circuit 470 which controls the operation of lift axle actuator 452. Transmission control circuit 200 provides vehicle mass alert 332 to lift axle control circuit 470 which, in response, automatically lowers lift axle 454 to redistribute the mass of vehicle 100 across multiple axles.

In one embodiment, transmission control circuit 200 is operatively coupled to prime mover control circuit 174. Transmission control circuit 200 provides vehicle mass alert 332 to prime mover control circuit 174 which, in response, automatically adjusts one or more operating characteristics of prime mover 102. For example, prime mover control circuit 174 may alter to select different engine torque curves for prime mover 102. Transmission control circuit 200 may be operatively coupled to one or more additional vehicle systems 472. For instance, transmission control circuit 200 may be operatively coupled to a suspension system of vehicular system 100 which, in response, to receiving vehicle mass alert 332 adjusts a suspension characteristic of vehicular system 100. Further, transmission control circuit 200 may alter one or more operating parameters of multi-speed automatic transmission 104 in response to vehicle mass alert 332. For example, transmission control circuit 200 may limit upshifting of multi-speed automatic transmission 104 to higher forward gears thus limiting the speed of vehicular system 100.

Returning to FIG. 4, transmission control circuit 200 includes vehicle road grade alert logic 354. In one embodiment, vehicle road grade alert logic 354 determines a road grade being experienced by vehicle 100 based on one or more of a plurality of operational characteristics 340. The plurality of operational characteristics 340 are monitored by a plurality of operational characteristic monitors. By monitoring, an operational characteristic monitor may sense a value indicative of a parameter or determine a parameter based on one or more sensed values and/or determined values. In one embodiment, a road grade characteristic is monitored by an inclination sensor. An exemplary inclination sensor is an accelerometer 204 (see FIG. 1) supported by vehicular system 100. As illustrated in FIG. 1, accelerometer 204 is supported by electro-hydraulic system 138 of multi-speed automatic transmission 104. Alternatively, the accelerometer may be internally disposed within transmission control circuit 200, internally disposed within prime mover control circuit 174, supported by multi-speed automatic transmission 104, supported by prime mover 102, or another component of vehicular system 100. In any event, accelerometer 204 may continuously measure road grade and communicate the measurement to transmission control circuit 200. Additional details regarding the measurement of road grade are provided in US Published Patent Application No. 2014/0336890, filed Jun. 18, 2013, titled SYSTEM AND METHOD FOR OPTIMIZING DOWNSHIFTING OF A TRANSMISSION DURING VEHICLE DECELERATION, the entire disclosure of which is expressly incorporated by reference herein.

Vehicle road grade alert logic 354 causes transmission control circuit 200 to issue a vehicle road grade alert 352 in response to a relationship of the determined road grade of the vehicle and a vehicle road grade threshold 336 satisfying a condition specified in vehicle road grade alert logic 354. In one example, the condition corresponds to the determined grade of the vehicle exceeding the vehicle road grade threshold 336. In another example, the condition corresponds to the determined road grade of the vehicle being within a first measure of the vehicle road grade threshold. Exemplary first measures of the vehicle road grade threshold include a percentage of the vehicle road grade threshold, an offset from the vehicle road grade threshold, and other exemplary measures.

In one example, road grade threshold 356 is set to about a ±3% grade. Values greater than +3% or less than −3% would be classified by transmission control circuit 200 as exceeding the road grade threshold whilst values at or between −3% and +3% would be classified by transmission control circuit 200 as below the road grade threshold. Other road grade threshold values are contemplated. Vehicle road grade alert logic 354, in one embodiment, determines both whether the condition is satisfied and whether the road grade is uphill or downhill.

Vehicle road grade alert logic 354, in one embodiment, determines the road grade of the vehicle based on one or more of operational characteristics 340 at spaced apart instances of time and issues vehicle road grade alert 352 when a first one of the spaced apart determined mass values exceed vehicle road grade threshold 356. Vehicle road grade alert logic 354, in one embodiment, determines the road grade of the vehicle based on one or more of operational characteristics 340 at spaced apart instances of time and issues vehicle road grade alert 352 when at least two of the spaced apart determined road grade values both exceed vehicle road grade threshold 356. Vehicle road grade alert logic 354, in one embodiment, determines the road grade of the vehicle based on one or more of operational characteristics 340 at spaced apart instances of time and issues vehicle road grade alert 352 when a measure of the spaced apart determined road grade values exceed vehicle road grade threshold 356 over a sampling window. For example, the measure may be a percentage of spaced apart determined road grade values within a sampling window (i.e. 5 samples in a 7 sample window). Vehicle road grade alert logic 354, in one embodiment, issues vehicle road grade alert 352 in response to a first condition and terminates vehicle road grade alert 352 in response to a second condition. In one example, the first condition is exceeding vehicle road grade threshold 356 and the second condition is dropping below a threshold value lower than vehicle road grade threshold 356.

Figure 9:
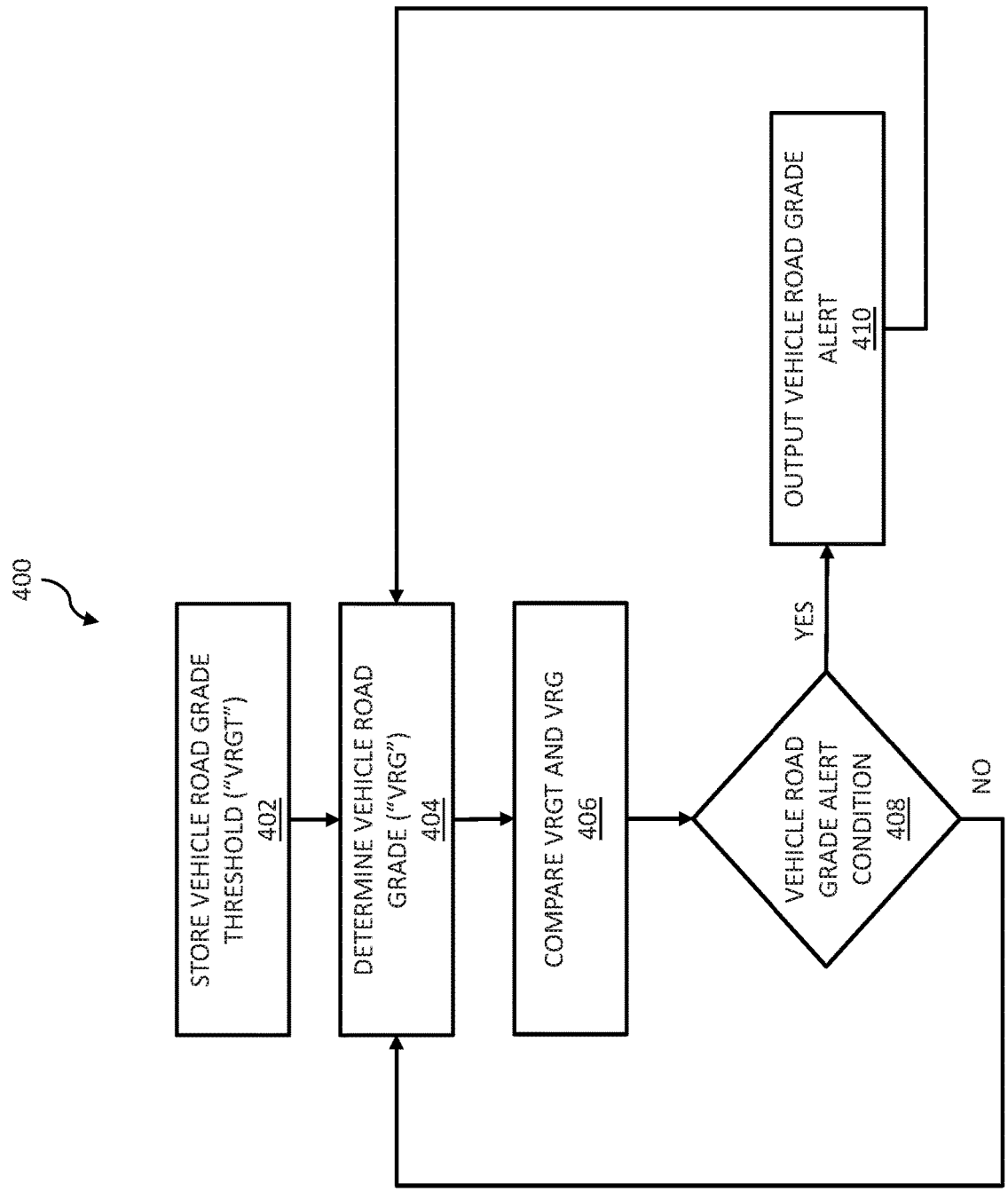
FIG. 9 illustrates an exemplary processing sequence of a vehicle road grade alert logic of the transmission control circuit of FIG. 4.

Referring to FIG. 9, an exemplary processing sequence 400 of vehicle road grade alert logic 354 is shown. A value for vehicle road grade threshold 356 is stored in non-transitory computer readable medium 202, as represented by block 402. In one embodiment, the value for vehicle road grade threshold 356 is provided through operator interface 300. In one embodiment, the value for vehicle road grade threshold 356 is received through communication input device 374 of transmission control circuit 200 from VEPS 376 (see FIG. 6). Vehicle road grade alert logic 354 determines the vehicle road grade, as represented by block 404. Vehicle road grade alert logic 354 compares the determined vehicle road grade to vehicle road grade threshold 356, as represented by block 406. Various exemplary comparison strategies are disclosed herein. Vehicle road grade alert logic 354 determines if a vehicle road grade alert condition exists based on the comparison, as represented by block 408. If a vehicle road grade alert condition does not exist, vehicle road grade alert logic 354 determines an updated value of the vehicle road grade, as represented by the return to block 404. If a vehicle road grade alert condition does exist, vehicle road grade alert logic 354 outputs a vehicle road grade alert, as represented by block 410 and subsequently determines an updated value of the vehicle road grade, as represented by the return to block 404.

In one embodiment, vehicle road grade alert logic 354, in addition to vehicle road grade alert 352, provides additional information to operator interface 300 and other vehicle systems. Exemplary additional information includes an indication that the determined vehicle road grade is below vehicle road grade threshold 356, that the calculation of the vehicle road grade is in process or not yet determined, and whether the vehicle road grade alert functionality is disabled.

As mentioned herein, vehicle road grade alert 352 may be communicated to operator interface 300 to notify the operator of operator interface 300. In one embodiment, transmission control circuit 200 is operatively coupled to prime mover control circuit 174. Transmission control circuit 200 provides vehicle road grade alert 352 to prime mover control circuit 174 which in response automatically adjusts one or more operating characteristics of prime mover 102. For example, one or both of transmission control circuit 200 and prime mover control circuit 174 may alter various characteristics to provide ascent assistance or descent assistance. Exemplary systems and methods for providing ascent assistance and descent assistance are disclosed in U.S. Pat. No. 9,365,201, filed Mar. 15, 2013, titled DEVICE, SYSTEM, AND METHOD FOR CONTROLLING TRANSMISSION TORQUE TO PROVIDE HILL ASCENT AND/OR DESCENT ASSISTANCE USING ROAD GRADE, the entire disclosure of which is expressly incorporated by reference herein.

In one embodiment, transmission control circuit 200 reports the determined vehicle mass value to prime mover control circuit 174, operator interface 300, and/or additional vehicle systems 472. In one embodiment, transmission control circuit 200 reports the determined vehicle road grade value to prime mover control circuit 174, operator interface 300, and/or additional vehicle systems 472.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A motive system for a vehicle comprising:
a multi-speed automatic transmission including an input member and an output member operatively coupled to the input member, the multi-speed automatic transmission being configurable in a plurality of forward speed ratios between the input member and the output member;
a transmission control circuit operatively coupled to the multi-speed automatic transmission, the transmission control circuit configures the multi-speed automatic transmission to establish each of the plurality of forward speed ratios;
a communication input device configured and programmed to receive a vehicle mass threshold from a user; and
a memory electrically coupled to the transmission control circuit and having stored thereon the vehicle mass threshold, wherein the transmission control circuit determines a vehicle mass of the vehicle, determines a relationship of the determined vehicle mass and the vehicle mass threshold, and outputs a vehicle mass operator alert when the relationship of the determined vehicle mass and the vehicle mass threshold satisfies a condition, the vehicle mass operator alert configured to generate an operator notification indicative of excess weight of the vehicle.

2. The motive system of claim 1, wherein the condition corresponds to the determined vehicle mass exceeding a vehicle mass threshold.

3. The motive system of claim 1, wherein the condition corresponds to the determined vehicle mass being within a first measure of a vehicle mass threshold.

4. The motive system of claim 3, wherein the first measure is a percentage of the vehicle mass threshold.

5. The motive system of claim 3, wherein the first measure is an offset from the vehicle mass threshold.

6. The motive system of claim 1, further comprising an operator interface operatively coupled to the transmission control circuit, the transmission control circuit provides the vehicle mass operator alert to the operator interface such that the operator interface outputs the operator notification indicative of excess weight of the vehicle.

7. The motive system of claim 6, wherein the operator interface provides at least one of a visual indication and an audio indication regarding the vehicle mass operator alert.

8. The motive system of claim 1, further comprising:
a frame supporting the multi-speed automatic transmission;
a prime mover supported by the frame and operatively coupled to the multi-speed automatic transmission;
a plurality of wheels positioned to support the frame above a road surface, at least one of the plurality of wheels being operatively coupled to the prime mover through the multi-speed automatic transmission;
a lift axle coupled to the frame, the lift axle carrying a first sub-set of the plurality of wheels, the lift axle being moveable between a first position wherein the first sub-set of the plurality of wheels are positioned to not contact the road surface and a second position wherein the first sub-set of the plurality of wheels are positioned to contact the road surface; and
a lift axle control circuit operatively coupled to the lift axle, the lift axle control circuit controls whether the lift axle is in the first position or the second position, wherein the lift axle control circuit is operatively coupled to the transmission control circuit, the transmission control circuit provides the vehicle mass operator alert to the lift axle control circuit.

9. The motive system of claim 8, wherein the lift axle control circuit positions the lift axle in the second position in response to the vehicle mass operator alert.

10. The motive system of claim 1, wherein the transmission control circuit includes a communication input device and the vehicle mass threshold is received by the transmission control circuit via the communication input device.

11. The motive system of claim 10, wherein the communication input device interfaces with a vehicle electronic programming station.

12. The motive system of claim 1, wherein the communication input device is operably connected to the transmission control circuit.

13. The motive system of claim 1, wherein the vehicle mass threshold is programmed into a vehicle electronic programming station which is also programmed with one or more sets of instructions or parameters, each set of the instructions or parameters corresponding to one of a plurality of levels of normal operation of the vehicle.

14. The motive system of claim 13, wherein the plurality of levels of the vehicle electronic programming station include vehicle operating instructions based on at least one of vehicle type, engine type, vehicle setup, vehicle operation, industry and application.

15. The motive system of claim 14, wherein the vehicle operating instructions include at least one of operating of an engine brake, operating a service brake, operating the forward speed ratio of the transmission, and setting an acceleration limit.

16. A method for providing a vehicle mass alert condition, the method comprising the steps of:
storing a vehicle mass threshold on a memory electrically coupled to a transmission control circuit of a multi-speed automatic transmission, the step of storing accomplished using a user-operated communication device;
determining a vehicle mass of a vehicle including the transmission control circuit of the multi-speed automatic transmission and the multi-speed automatic transmission;
determining a relationship of the determined vehicle mass of the vehicle and the vehicle mass threshold; and
outputting a vehicle mass operator alert when the relationship of the determined vehicle mass of the vehicle and the vehicle mass threshold satisfies a condition, the vehicle mass operator alert configured to generate an operator notification indicative of excess weight of the vehicle.

17. A motive system for a vehicle, comprising:
a multi-speed automatic transmission including an input member and an output member operatively coupled to the input member, the multi-speed automatic transmission being configurable in a plurality of forward speed ratios between the input member and the output member;
a transmission control circuit operatively coupled to the multi-speed automatic transmission, the transmission control circuit configures the multi-speed automatic transmission to establish each of the plurality of forward speed ratios;
a communication input device configured and programmed to receive a vehicle road grade threshold from a user; and
a memory electrically coupled to the transmission control circuit and having stored thereon the vehicle road grade threshold, wherein the transmission control circuit determines a vehicle road grade of the vehicle, determines a relationship of the determined vehicle road grade of the vehicle and the vehicle road grade threshold, and outputs a vehicle road grade operator alert when the relationship of the determined vehicle road grade and the vehicle road grade threshold satisfies a condition, the vehicle road grade operator alert configured to generate an operator notification indicative of excess road grade for the vehicle.
generate an operator notification indicative of excess road grade for the vehicle.

18. The motive system of claim 17, wherein the condition corresponds to the determined vehicle road grade exceeding a vehicle road grade threshold.

19. The motive system of claim 17, wherein the condition corresponds to the determined vehicle road grade being within a first measure of a vehicle road grade threshold.

20. The motive system of claim 19, wherein the first measure is a percentage of the vehicle road grade threshold.

21. The motive system of claim 19, wherein the first measure is an offset from the vehicle road grade threshold.

22. The motive system of claim 17, further comprising an operator interface operatively coupled to the transmission control circuit, the transmission control circuit provides an indication of the vehicle road grade operator alert to the operator interface such that the operator interface outputs the operator notification indicative of excess road grade for the vehicle.

23. The motive system of claim 22, wherein the operator interface provides at least one of a visual indication and an audio indication regarding the vehicle road grade operator alert.

24. The motive system of claim 17, wherein the multi-speed automatic transmission includes an inclination sensor operatively coupled to the transmission control circuit and the transmission control circuit determines the vehicle road grade based on the inclination sensor.

25. The motive system of claim 17, wherein the communication input device is operably connected to the transmission control circuit.

26. The motive system of claim 17, wherein the vehicle mass threshold is programmed into a vehicle electronic programming station which is also programmed with one or more sets of instructions or parameters, each set of the instructions or parameters corresponding to one of a plurality of levels of normal operation of the vehicle.

27. The motive system of claim 26, wherein the plurality of levels of the vehicle electronic programming station include vehicle operating instructions based on at least one of vehicle type, engine type, vehicle setup, vehicle operation, industry and application.

28. The motive system of claim 27, wherein the vehicle operating instructions include at least one of operating of an engine brake, operating a service brake, operating the forward speed ratio of the transmission, and setting an acceleration limit.

29. A method for providing a vehicle road grade alert condition, the method comprising the steps of:

storing a vehicle road grade threshold on a memory electrically coupled to a transmission control circuit of a multi-speed automatic transmission, the step of storing accomplished using a user-operated communication device;

determining a vehicle road grade of a vehicle including the transmission control circuit of the multi-speed automatic transmission and the multi-speed automatic transmission;

determining a relationship of the determined vehicle road grade and the vehicle road grade threshold; and outputting a vehicle road grade operator alert when the relationship of the determined vehicle road grade and the vehicle road grade threshold satisfies a condition, the vehicle road grade operator alert configured to generate an operator notification indicative of excess road grade for the vehicle.

* * * * *